United States Patent
Yalniz et al.

(10) Patent No.: US 9,779,444 B2
(45) Date of Patent: Oct. 3, 2017

(54) RECOMMENDATIONS UTILIZING VISUAL IMAGE ANALYSIS

(71) Applicant: A9.com, Inc., Palo Alto, CA (US)

(72) Inventors: Ismet Zeki Yalniz, Mountain View, CA (US); Sunil Ramesh, San Jose, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 15/498,843

(22) Filed: Apr. 27, 2017

(65) Prior Publication Data

US 2017/0228809 A1   Aug. 10, 2017

Related U.S. Application Data

(63) Continuation of application No. 14/303,237, filed on Jun. 12, 2014, now Pat. No. 9,639,957.

(51) Int. Cl.
*G06Q 30/06* (2012.01)
*G06T 7/90* (2017.01)
*G06T 11/00* (2006.01)

(52) U.S. Cl.
CPC ..... *G06Q 30/0631* (2013.01); *G06Q 30/0625* (2013.01); *G06Q 30/0643* (2013.01); *G06T 7/90* (2017.01); *G06T 11/001* (2013.01)

(58) Field of Classification Search
None
See application file for complete search history.

(56) References Cited

U.S. PATENT DOCUMENTS

2001/0034668 A1* 10/2001 Whitworth ............. G06Q 30/06
705/26.3
2014/0032359 A1* 1/2014 Dewangan ......... G06Q 30/0631
705/26.7

* cited by examiner

*Primary Examiner* — Michelle Chin
(74) *Attorney, Agent, or Firm* — Thomas | Horstemeyer, LLP

(57) ABSTRACT

Disclosed are various embodiments for generating recommendations utilizing visual image analysis, for example, by inserting a representative image of an item in an empty region of a digital image. Representative images for an item may be determined by generating a score for each potential image for insertion into the digital image, where a representative image is selected having a highest score from the ranking. The representative image selected may be preprocessed such that the image appears naturally in the setting.

20 Claims, 9 Drawing Sheets

RECOMMENDATIONS UTILIZING VISUAL IMAGE ANALYSIS

CROSS-REFERENCE TO RELATED APPLICATION

This application is a continuation of, and claims the benefit of and priority to, U.S. patent application Ser. No. 14/303,237, entitled "RECOMMENDATIONS UTILIZING VISUAL IMAGE ANALYSIS," filed on Jun. 12, 2014, the contents of which are hereby incorporated by reference in their entirety herein.

BACKGROUND

Electronic commerce systems traditionally comprise a marketplace of hundreds to thousands of items available for purchase. Navigating the vast number of items in an electronic commerce system traditionally requires a user to conduct various searches using a search engine or requires a user to navigate an extensive item taxonomy to dial down to an item page describing an item. The item page may show one or more images of the item and may provide a detailed description. Yet, it remains difficult for the user to perceive how an item may look in a particular setting. For example, if the user navigates to the item page for a sofa, it is difficult for the user to visualize how the sofa may look in a living room, a dining room, or a similar setting. Moreover, the user may not have knowledge about decorating trends, style habits, color pallets, etc.

Computer vision relates to analyzing, interpreting, understanding, and deriving information from digital images obtained via digital cameras or similar image capturing devices. Such information may be used in automated color detection, depth perception, and object recognition in computing environments. Information may be derived in computer vision by analyzing or comparing each pixel in the digital image to determined thresholds such that colors may be detected and objects may be recognized.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to generating recommendations utilizing visual image analysis. As discussed above, electronic commerce systems traditionally comprise a marketplace of hundreds to thousands of items available for purchase, download, rental, lease, etc. Navigating the vast number of items in an electronic commerce system traditionally requires a user to conduct various searches using a search engine or requires a user to navigate an extensive item taxonomy to dial down to an item page describing an item. The item page may show one or more images of the item and may provide a detailed description. Yet, it remains difficult for the user to perceive how an item may look in a particular setting. For example, if the user navigates to the item page for a sofa, it is difficult for the user to visualize how the sofa may look in a living room, a dining room, or a similar setting. Moreover, the user may not have knowledge about decorating trends, style habits, color pallets, etc. Accordingly, it may be beneficial for a user to provide a digital image of a setting in which the item may be visualized.

According to various embodiments, the electronic commerce system may communicate with various image processing services, such as an image analysis engine and/or an image modification engine, to analyze a digital image of a setting (e.g., a room) provided by a user. The analysis of the digital image may identify various characteristics about the setting, such as colors, sizes, dimensions, or locations of various objects in the setting. Further, the image processing services may identify regions in the setting in which no object is recognized (hereinafter referred to as empty regions). The electronic commerce system may leverage a recommendation service to identify an item to recommend to the user by utilizing the various characteristics about the room identified in the digital image and/or historical data associated with the user in the electronic commerce system. The recommended item may be an item available for consumption over an electronic commerce system. Further, an image modification engine may generate a digital image comprising the recommended item in at least one of the empty region of the setting.

Figure 1:
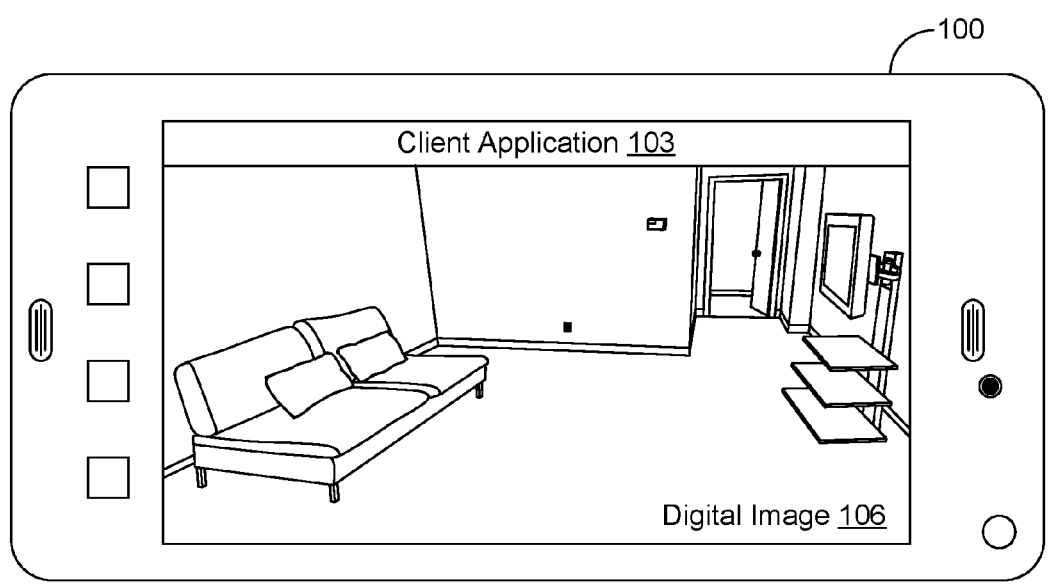
FIG. 1 is a drawing of a client device capturing a digital image according to various embodiments of the present disclosure.

With reference to FIG. 1, shown is a client device 100 (e.g., a smartphone) executing a client application 103 configured to capture a digital image 106 of a setting according to various embodiments of the present disclosure. Although shown in FIG. 1 as a smartphone, the client device 100 may further comprise a smart camera, a laptop computer, a personal digital assistant, a cellular telephone, a set-top box, a music player, a web pad, a tablet computer system, a game console, an electronic book reader, a robotic device, or any other device comprising or capable of communication with an image capturing device.

The client application 103 executable on the client device 100 may comprise features similar to or the same as an image capturing application. To this end, the client application 103 is configured to capture the digital image 106 of the setting at the direction of the user. As may be appreciated, the client device 100 comprises one or more image capturing devices, such as a front-facing digital camera or a rear-facing digital camera. By engaging the client device 100 (e.g., by manipulating a capture button), the client application 103 may render the digital image 106 generated by at least one of the image capturing devices. The client application 103 may include functionality beyond capturing the digital image 106, such as displaying items recommended for the user, as will be described in greater detail below.

As shown in FIG. 1, the client device 100 may be used by the user to capture the digital image 106 of a living room, although other settings may be imagined. For example, the user may capture the digital image 106 embodying a bedroom, bathroom, garage, yard, office, cubicle, garden, or similar setting. As will be discussed in greater detail below, the digital image 106 may be analyzed to identify various characteristics of the digital image 106 such that one or more recommended items may be presented to the user. In the following discussion, a general description of the system and its components is provided, followed by a discussion of the operation of the same.

Figure 2:
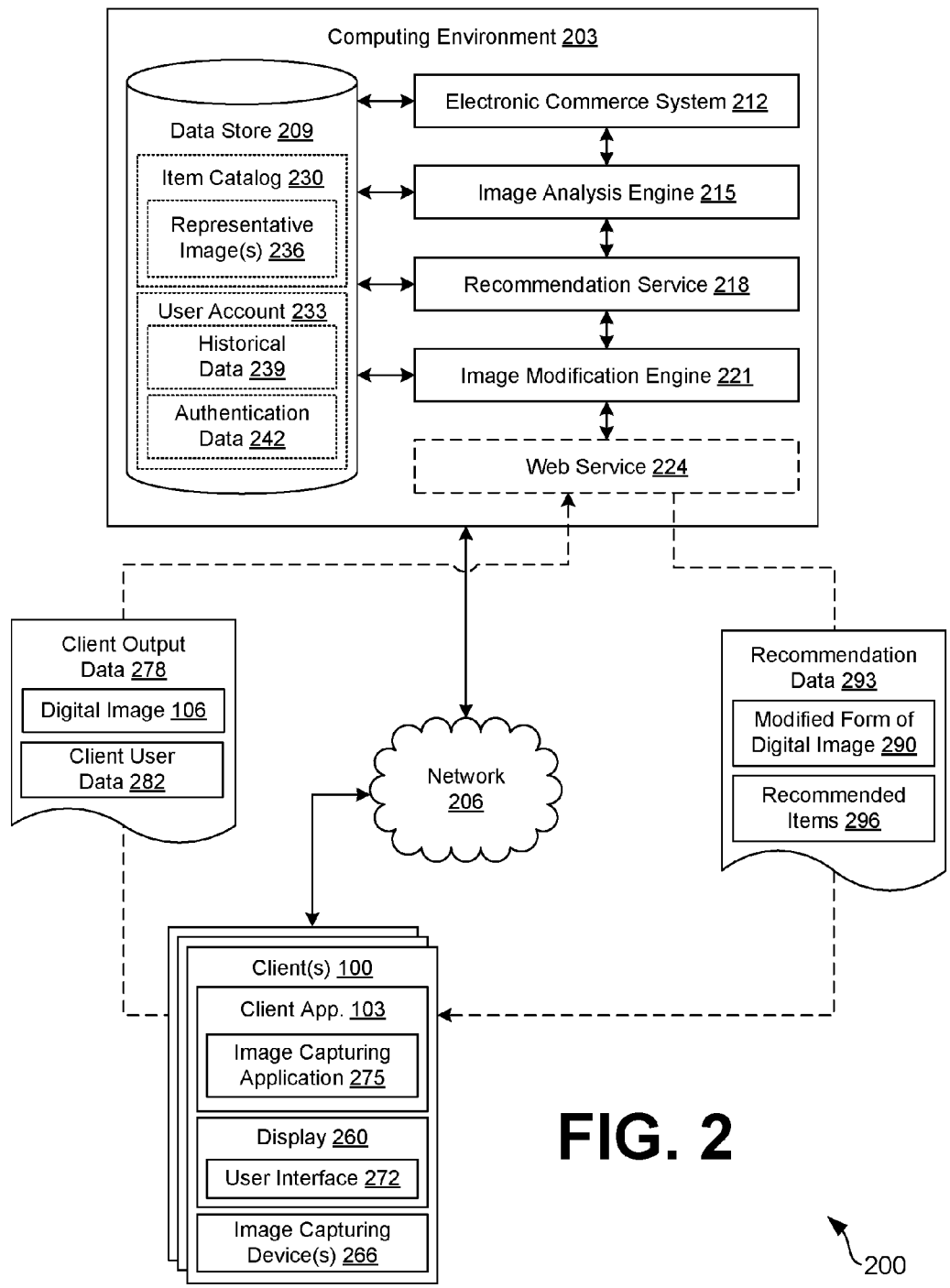
FIG. 2 is a drawing of a networked environment comprising the client device of FIG. 1 according to various embodiments of the present disclosure.

Referring next to FIG. 2, shown is a networked environment 200 according to various embodiments. The networked environment 200 includes a computing environment 203 and a client device 100, which are in data communication with each other via a network 206. The network 206 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 209 that is accessible to the computing environment 203. The data store 209 may be representative of a plurality of data stores 209 as can be appreciated. The data stored in the data store 209, for example, is associated with the operation of the various applications and/or functional entities described below.

The components executed on the computing environment 203, for example, include an electronic commerce system 212, an image analysis engine 215, a recommendation service 218, an image modification engine 221, a web service 224, and other applications, services, processes, systems, engines, or functionality not discussed in detail herein. The electronic commerce system 212 is executed in order to facilitate the online purchase of items over the network 206. The electronic commerce system 212 also performs various backend functions associated with the online presence of a merchant in order to facilitate the online purchase of items as will be described. For example, the electronic commerce system 212 generates network pages such as web pages or other types of network content that are provided to client devices 100 for the purposes of selecting items for purchase, rental, download, lease, or other forms of consumption as may be appreciated.

The image analysis engine 215 is executed to access the digital image 106 provided by the client device 100 to identify various characteristics about the setting shown in the digital image 106. To this end, the digital image 106 may comprise any type of information sensed from the environment such as a laser scan, a frame of a video, a two-dimensional image, a three-dimensional map, a three-dimensional reconstruction, 2.55D digital image, etc. The characteristics identified by the image analysis engine 215 may include, for example, the types, identities, colors, sizes, dimensions, or locations of various objects in the setting. Further, the image analysis engine 215 may identify empty regions in the setting in which no object is recognized, as will be discussed in greater detail below.

The recommendation service 218 is executed to identify one or more items in an item catalog 230 to recommend to the user by utilizing the various characteristics about the room identified in the digital image. The recommendation service 218 may further utilize historical data 239 associated with the user in the electronic commerce system 215 to recommend one or more items.

The image modification engine 221 is executed to generate a new or modified form of the digital image 106 such that the one or more recommended items are shown in the empty regions of the digital image 106. To this end, the image modification engine 221 may access representative images 236 of the recommended items in the item catalog 230 and manipulate the representative images 236 such that they seem natural in the setting of the digital image 106 provided by the user via the client device 100.

The web service 224 is executed to provide a medium for communication between the computing environment 203 and one or more client devices 100 over the network 206. To this end, the web service 224 may comprise a web-based application programming interface (API) embodied in software that facilitates programmatic service calls (e.g., API calls) made by the client devices 100 to communicate with the electronic commerce system 212, the image analysis engine 215, the recommendation service 218, the image modification engine 221, and/or other services or applications not described herein. According to various embodiments, the web-based API may further comprise a representational state transfer (REST) or a simple object access protocol (SOAP) API.

The data stored in the data store 209 includes, for example, an item catalog 230, user accounts 233, and potentially other data. The item catalog 230 may include various data regarding items in a catalog. Such items may correspond to products, goods, services, downloads, and so on, which may be offered for order by one or more merchants by way of the electronic commerce system 212. The various data regarding each item may include name, description, price, genre, subgenre, categories, representative images 236, videos, tax categories, options, shipping categories, and so on.

The user accounts 233 may include various data associated with users of the electronic commerce system 212 and/or the client application 103. The various data associated with each of the user accounts 233 includes historical data 239 and authentication data 242. Historical data 239 comprises data associated with terms searched, item pages viewed, items purchased or consumed, and/or navigation history of the user relative to the electronic commerce system 212. Authentication data 242 comprises data associated with authenticating the user of the electronic commerce system 212 and/or the client application 103. To this end, authentication data 242 may comprise a username, a password, password recovery information, an e-mail address, biometric data, and/or any other data that can be used to authenticate the user.

The client device 100 is representative of a plurality of client devices 100 that may be coupled to the network 206. The client device 100 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smart cameras, or other devices with like capability. The client device 100 may include a display 260 and/or one or more image capturing devices 266 such as a front-facing digital camera or rear-facing digital camera. The display 260 may comprise, for example, devices such as liquid crystal display (LCD) displays, gas plasma-based flat panel displays, organic light emitting diode (OLED) displays, electrophoretic ink (E ink) displays, LCD projectors, or other types of display devices, etc.

The client devices 100 may be configured to execute various applications such as the client application 103 and/or other applications. The client application 103 may be executed in the client device 100, for example, to access network content served up by the computing environment 203 and/or other servers, thereby rendering a user interface 272 on the display 260. In addition, the client application 103 may be executed in the client device 100, for example, to capture one or more digital images 106 utilizing the one or more image capturing devices 266. To this end, the client application 103 may comprise, for example, an imaging capturing application 275, a web browsing application, a dedicated mobile application, or any combination thereof, and the user interface 272 may comprise a network page, an application screen, etc. The client devices 100 may be configured to execute applications beyond the client application 103 such as, for example, email applications, social networking applications, word processors, spreadsheets, and/or other applications.

Next, a general description of the operation of the various components of the networked environment 100 is provided. To begin, it is assumed the user of the electronic commerce system 212 and/or the client application 103 desires to receive suggestions for items that may be purchased or otherwise consumed via the electronic commerce system 212. As a non-limiting example, the user may desire to browse items in the item catalog 230 recommended for the user according to characteristics (e.g., layout, floor plan, color pallet) of a setting embodied in a digital image 106 provided by the user.

Accordingly, the user may capture a digital image 106 of a setting via the image capturing device 266, such as a front-facing digital camera or a rear-facing digital camera embedded within a smartphone, tablet computing device, or similar device. In alternative embodiments, the digital image 106 may be obtained via an external device, such as a digital camera, and provided to the computing environment 203 via the client device 100 or another device, as may be appreciated.

After a capture, the digital image 106 may be stored locally on the client device 100 (e.g., in a buffer or in local memory) until viable communication is established between the client device 100 and the computing environment 203. When viable communication is established (e.g., over a wireless fidelity [Wi-Fi] or cellular network), the digital image 106 may be communicated to the computing environment 203 as client output data 278 via the web service 224. The client output data 278 may further comprise client user data 282 collected by the client application 103 on the client device 100. To this end, client user data 282 may comprise, for example, a navigation history, a purchase history, and/or other data collected by the client device 100. According to various embodiments, the computing environment 203 may store the digital image 106 and/or the client user data 282 in association with the user via the user account 233 in the data store 209.

The image analysis engine 215 may then be employed to access the digital image 106 to identify various characteristics about the room or setting embodied in the digital image 106. The characteristics capable of being detected by various image processing methodologies include colors of objects in the room or setting; the lighting; the type, identity, size, shape, and arrangement of the objects in the room; empty regions in the room; and/or other characteristics. The characteristics identified in the digital image 106 may be stored in association with the user and may be used in future recommendations, as may be appreciated.

The image analysis engine 215 may communicate the identified characteristics to the recommendation service 218 to identify one or more items in the item catalog 230 that may be recommended to the user. According to various embodiments, the items recommended to the user may be determined utilizing at least the historical data 239 associated with the user account 233, historical data 239 associated with a plurality of user accounts 233, as well as the characteristics of the setting identified in the digital image 106. For example, the items recommended to the user may be determined based at least in part on the colors identified in the room; the lighting; the size, shape, and arrangement of the objects in the room; the empty regions; and/or other characteristics.

In another example, collaborative filtering may be applied to filter the historical data 239 associated with a plurality of user accounts 233 to identify patterns, such as purchase or item consumption patterns. To this end, interests of a specific user may be estimated by collecting preferences or taste information from similar users. For example, the recommendation service 218 may apply collaborative filtering for interior decorating tastes by making predictions about which types of furniture a user may like given a partial list of that user's tastes, for example, obtained from historical data 239 (e.g., a user likes something by purchasing the item) for the user. By comparing the user's tastes to user accounts 233 with the same or similar tastes, an item may be recommended to the user that the user may similarly enjoy. As may be appreciated, the recommended item is identified from a plurality of items in the item catalog 230 and offered for consumption via the electronic commerce system 212.

Next, the image modification engine 221 may be leveraged such that the recommended item may be "inserted" into at least one of the empty regions identified in the digital image 106. The image modification engine 221 may utilize existing representative images 236 accessed, for example, from the data store 209 for insertion into at least one of the empty regions in the digital image 106 by the image modification engine 221. Insertion may comprise taking all or a portion of at least one representative image 236 and inserting the all or a portion of the at least one representative image 236 of the item into the digital image 106 such that the recommended item appears in the setting provided by the user.

As may be appreciated, the recommended item may comprise more than one representative image 236 stored in the item catalog 230, such as the various images shown in the product page corresponding to the item in the electronic commerce system 212. Accordingly, the item modification engine 221 may find a best match utilizing the various characteristics of the digital image 206 identified via the image analysis engine 215. As a non-limiting example, the image modification engine 221 may employ a ranking of the representative images in the data store 209 to identify at least one of the most relevant representative images to insert in the digital image 106. For example, the items may be ranked according to a score calculated for each of the representative images according to the characteristics identified in the digital image 106 and/or predefined weights associated with the characteristics.

According to various embodiments, the image modification engine 221 may preprocess the representative image 236 of the recommended item prior to insertion into the empty region of the digital image 106. Preprocessing may comprise applying a filter to the representative image 236, scaling the representative image 236, rotating the representative image 236, removing a background of the representative image 236, adjusting a color of the recommended item embodied in the representative image 236, and/or removing a portion of the representative image. As a non-limiting example, a representative image 236 of a sofa may be preprocessed such that a color of the sofa is changed and the size of the sofa is scaled to be consistent with the scale of the setting embodied in the digital image 106. In another example, the background of the representative image 236 of the sofa may be removed such that the sofa may be applied in the setting of the digital image 106. In yet another example, a portion of the representative image 236 of the sofa may be removed or modified such that foreground objects in the digital image 106 may appear to be in front of the sofa.

The image modification engine 221 ultimately generates a modified form of the digital image 290 comprising at least the recommended item in the at least one of the empty regions identified in the setting. The modified form of the digital image 290 may comprise a new digital image file in various image formats (e.g., JPEG, GIF, PNG, BMP, TIFF) or may comprise a modified version of the same digital image 106 provided by the user. Subsequently, the computing environment 203 may transmit the modified form of the digital image 290 as recommendation data 293 to the client device 100 via the web service 224 for rendering in the display 260. The recommendation data 293 may further comprise the one or more recommended items 296, as will be described in greater detail below.

As may be appreciated, the modified form of the digital image 290 may be encoded for rendering by the computing environment 203 or the client device 100. According to various embodiments, a dynamic region may be encoded on or over the recommended item of the digital image 106 such that, when the region corresponding to the recommended item is manipulated by the user, additional information associated with the recommended item may be shown to the user, as will be discussed in greater detail below.

Figure 3:
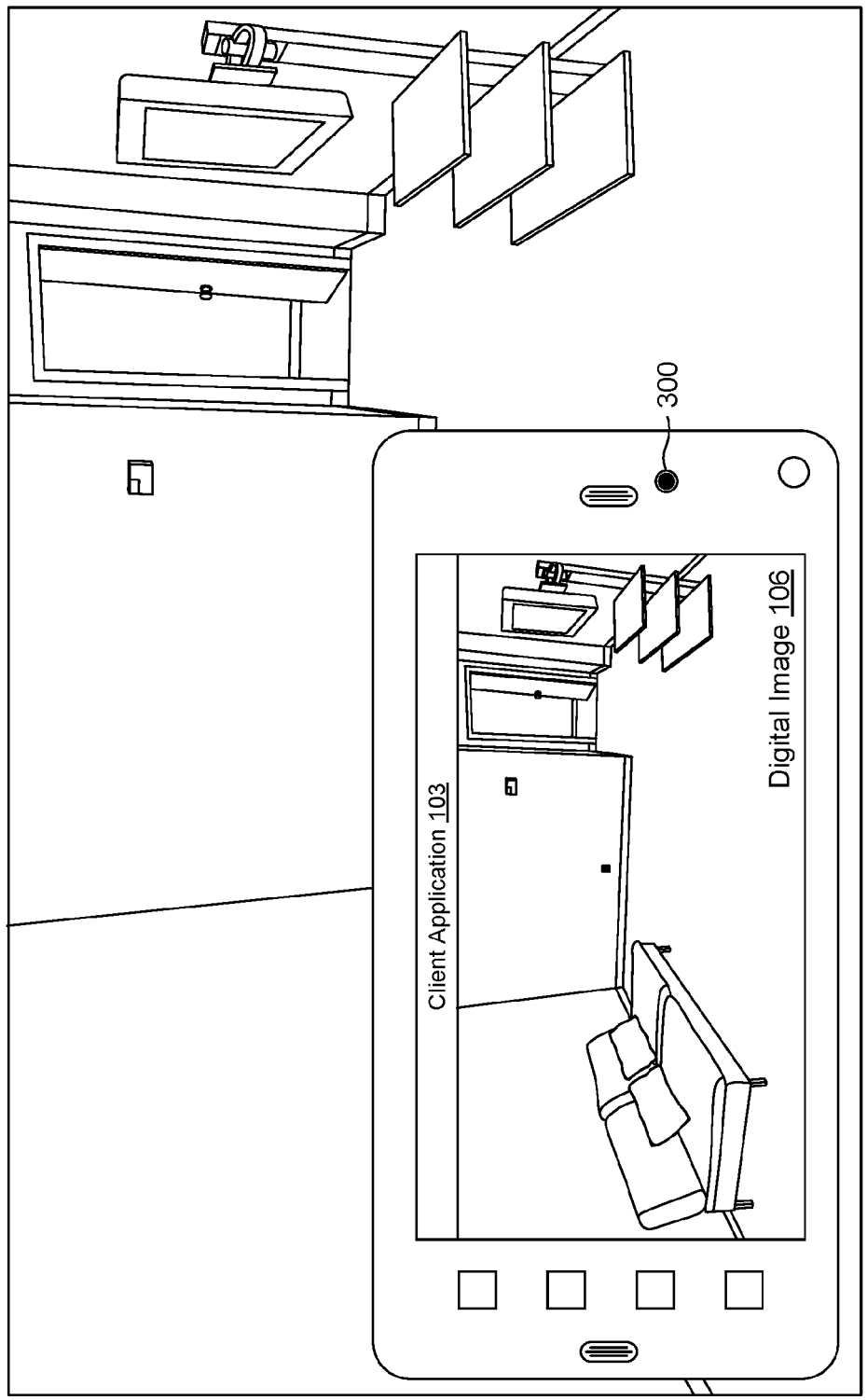
FIG. 3 is a drawing of the client device of FIG. 1 capturing the digital image in a room setting according to various embodiments of the present disclosure.

Referring next to FIG. 3, the client device 100 is shown capturing the digital image 106 in a room setting according to various embodiments of the present disclosure. As discussed above, the client application 103 is configured to capture the digital image 106 of the room at the direction of the user. As may be appreciated, the client device 100 may employ one or more image capturing devices 266, such as a front-facing digital camera (not shown) or a rear-facing digital camera 300, to capture the digital image 106. As a non-limiting example, the user may capture the digital image 106 embodying a bedroom, a bathroom, a living room, a dining room, a garage, a yard, shelving, a warehouse, or a similar setting.

Figure 4A:
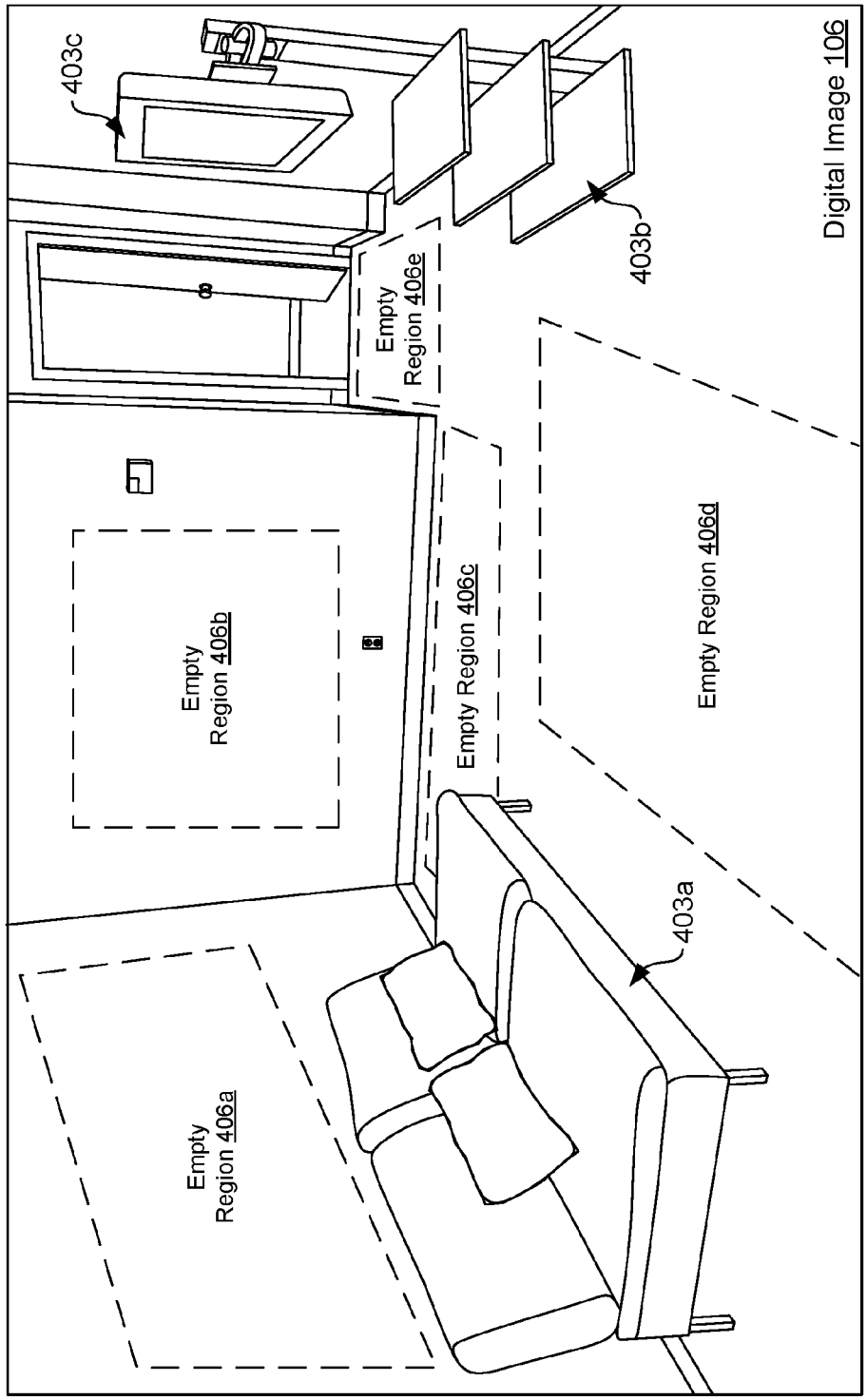
FIG. 4A is a drawing describing detection of empty regions in the digital image captured by the client device of FIG. 3 according to various embodiments of the present disclosure.

Turning now to FIG. 4A, detection of one or more objects 403a . . . 403c (collectively objects 403) and/or empty regions 406a . . . 406e (collectively empty regions 406) in the digital image 106 is shown, according to various embodiments of the present disclosure. In the non-limiting example of FIG. 4A, the image analysis engine 215 (FIG. 2) is employed to identify various characteristics about the digital image 106. As a non-limiting example, the image analysis engine 215 may detect the presence and size of objects 403a . . . 403c comprising a sofa, a television stand, and a television, respectively. Object recognition may be employed by identifying changes in lighting or color; changes in a viewing direction; changes in size or shape; edge detection (e.g., Canny edge detection); invariance; edge matching; geometric hashing; pose estimation; scale-invariant feature transform; a combination thereof; and/or similar strategies. The initial detection of objects may be further refined using genetic matching or similar heuristics.

Shape or pattern recognition may be employed by comparing a region of the digital image 106 to shapes or patterns stored in the data store 209 to determine a type of the object 403 although, in various embodiments, the type of the object 403 may not be determined. For example, recommended items may be determined and inserted into the modified form of the digital image 290 regardless of whether the objects 403 in the digital image 106 are identified. Further, the image analysis engine 215 may determine other characteristics about the setting, such as colors, sizes, materials, textures, dimensions, or locations of various objects in the setting. The locations of various objects in the setting may be used in generating a recommended item. For example, the image analysis engine 215 may determine a proximity of an empty region relative to an object that may be identified via the shape or pattern recognition. As may be appreciated, the proximity may be indicative of a type of item that should be placed within a predefined distance of the identifiable object. As a non-limiting example, an empty region located on a floor near a couch may indicate that a suitable recommended item would comprise a rug, a table stand, a standing light, etc.

According to various embodiments, if the presence or a mere indication of a presence of an object 403 in the digital image 106 is detected and the image analysis engine 215 is unable to confirm the presence and/or identity of the object 403, the user of the client device 100 may be prompted with the region of digital image 106 in which the object 403 was detected. The user may provide input as to whether the region is, in fact, an object 403 and/or may provide information as to the type of the object 403 that may be used by the recommendation service 218 in generating one or more recommended items.

Further, the image analysis engine 215 may determine characteristics for each of the empty regions 406 which may be used in determining a recommended item for a corresponding one of the empty regions 406. For example, a first empty region 406a and a second empty region 406b may be determined to be an empty space on a wall using visual image analysis. In this example, a recommended item, such as a wall ornament, a canvas painting, wallpaper, etc., may be positioned in the first empty region 406a and/or the second empty region 406b, as will be described in greater detail below.

Similarly, a third empty region 406c, a fourth empty region 406d, and a fifth empty region 406e may be determined to be an empty space on a floor using the same visual image analysis. In this example, a recommended item, such as a piece of furniture, a rug, etc., may be positioned in the third empty region 406c, the fourth empty region 406d, and/or the fifth empty region 406e, as will be described in greater detail below.

Figure 4B:
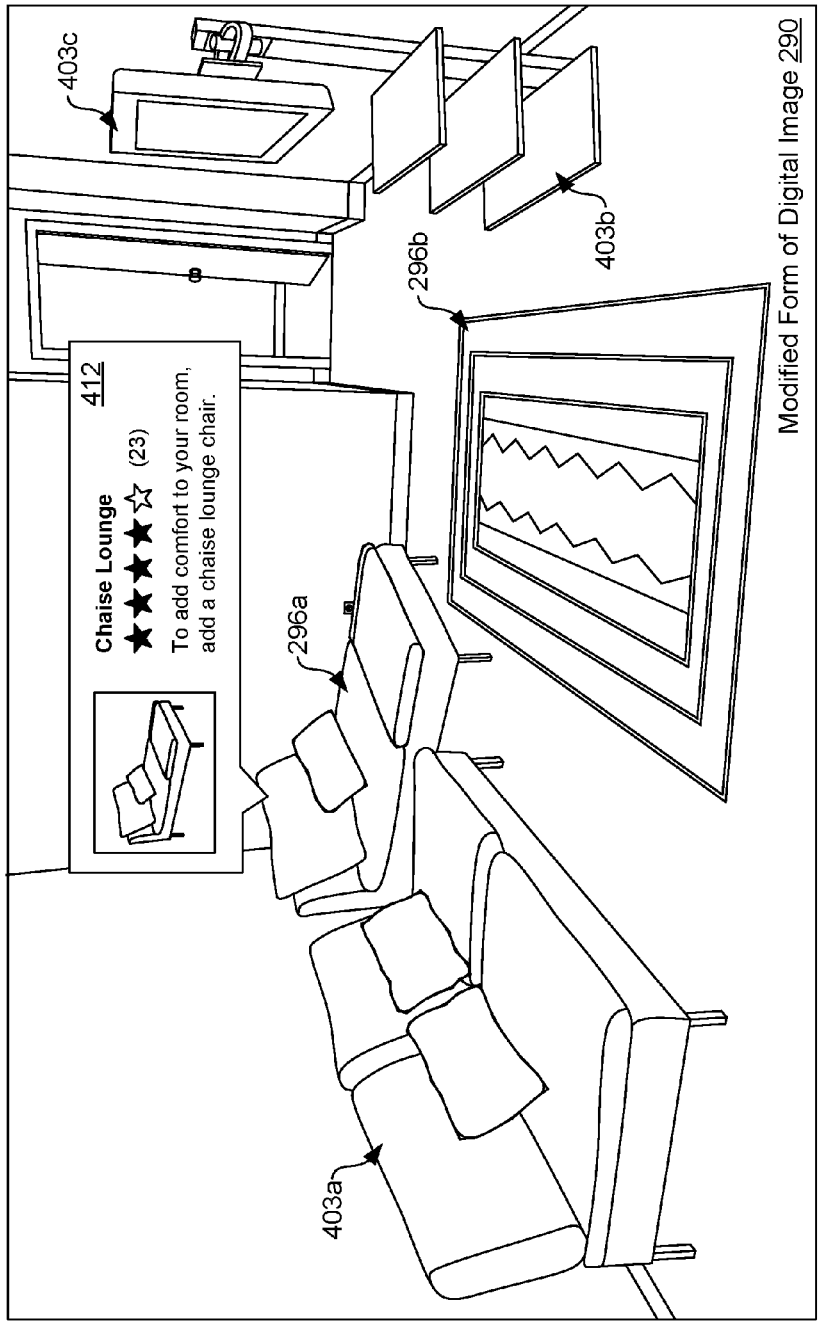
FIG. 4B is a drawing describing insertion of recommended items in the digital image captured by the client device of FIG. 3 according to various embodiments of the present disclosure.

Moving on to FIG. 4B, insertion of recommended items in the digital image 106 is described according to various embodiments of the present disclosure. In the non-limiting example of FIG. 4B, a first recommended item 296a and a second recommended item 296b (collectively recommended items 296) are shown in the third empty region 406c (FIG. 4A) and the fourth empty region 406d (FIG. 4A), respectively. As the third empty region 406c and the fourth empty region 406d were located on the floor of the setting, the recommendation service 218 may recommend items suitable for placement on the floor, such as a chaise lounge chair (recommended item 296a) and a flatwoven rug (recommended item 296b). Further, the recommendation service 218 may utilize a proximity of at least one of the empty regions 406 to at least one of the objects 403 capable of identification to determine a recommended item. For example, the chaise lounge chair (recommended item 296a) may be recommended based on the third empty region 406c being within a threshold distance to the first object 403a (e.g., the couch) which the image analysis engine 215 may identify based upon its shape or pattern.

Accordingly, the representative image 236 of the recommended items may be inserted in the modified form of the digital image 290, thereby permitting the user to visualize the recommended items in the setting provided by the user. The representative image 236 may be preprocessed, as described above, to conform the representative image 236 with the setting without obstructing the appearance of the objects 403a . . . 403c, if necessary. For example, the representative image 236 of the flatwoven rug (recommended item 296b), may be skewed, scaled and/or rotated such that it conforms with the perspective of the setting. Similarly, the color of the chaise lounge chair (recommended item 296a) may be modified from the representative image 236 such that it conforms to a color pallet of the setting. In addition, a bottom-left portion of the chaise lounge chair (recommended item 296a) may be removed and/or made transparent such that it appears in a background of the setting relative to the first object 403a.

According to various embodiments, the modified form of the digital image 290 may be generated such that a dynamic region is encoded in association with the recommended item 296. Upon a manipulation of the dynamic region, additional information associated with the recommended items 296 may be shown to the user. As a non-limiting example, in FIG. 4B, the user may manipulate or otherwise engage the recommended item 296a to initiate a rendering of a dialog 412 that shows a name, a description, and an average review of the recommended item 296a.

Figure 5A:
FIG. 5A is a pictorial diagram of an example user interface rendered by the client device in the networked environment of FIG. 2 according to various embodiments of the present disclosure.

Referring next to FIG. 5A, shown is an example user interface 272 rendered by the client device 100 (FIG. 1) in the networked environment of FIG. 2 according to various embodiments of the present disclosure. In the non-limiting example of FIG. 5A, the client device 100 may comprise a desktop computing device or a similar computing device capable of executing a web browsing application to render the user interface 272. As shown in FIG. 5A, the user interface 272 may comprise the modified form of the digital image 290 depicting the recommended items 296 inserted in the empty regions 406 (FIG. 4A).

Further, one or more of the recommended items 296 may be shown in another portion of the user interface 272 to facilitate placement of the recommended items 296 in a virtual shopping cart of the electronic commerce system 212 (FIG. 2). As a non-limiting example, a list of the recommended items 296 may be shown in association with the modified form of the digital image 290. The list of the recommended items 296 may comprise a name, a description, a price, an average review, the representative images 236a . . . 236b, and/or other information associated with the recommended item 296. As may be appreciated, a first add to cart component 503a and a second add to cart component 503b (collectively add to cart components 503) may facilitate placement of the first recommended item 296a and the second recommended item 296b, respectively, in the virtual shopping cart upon a manipulation by the user.

Figure 5B:
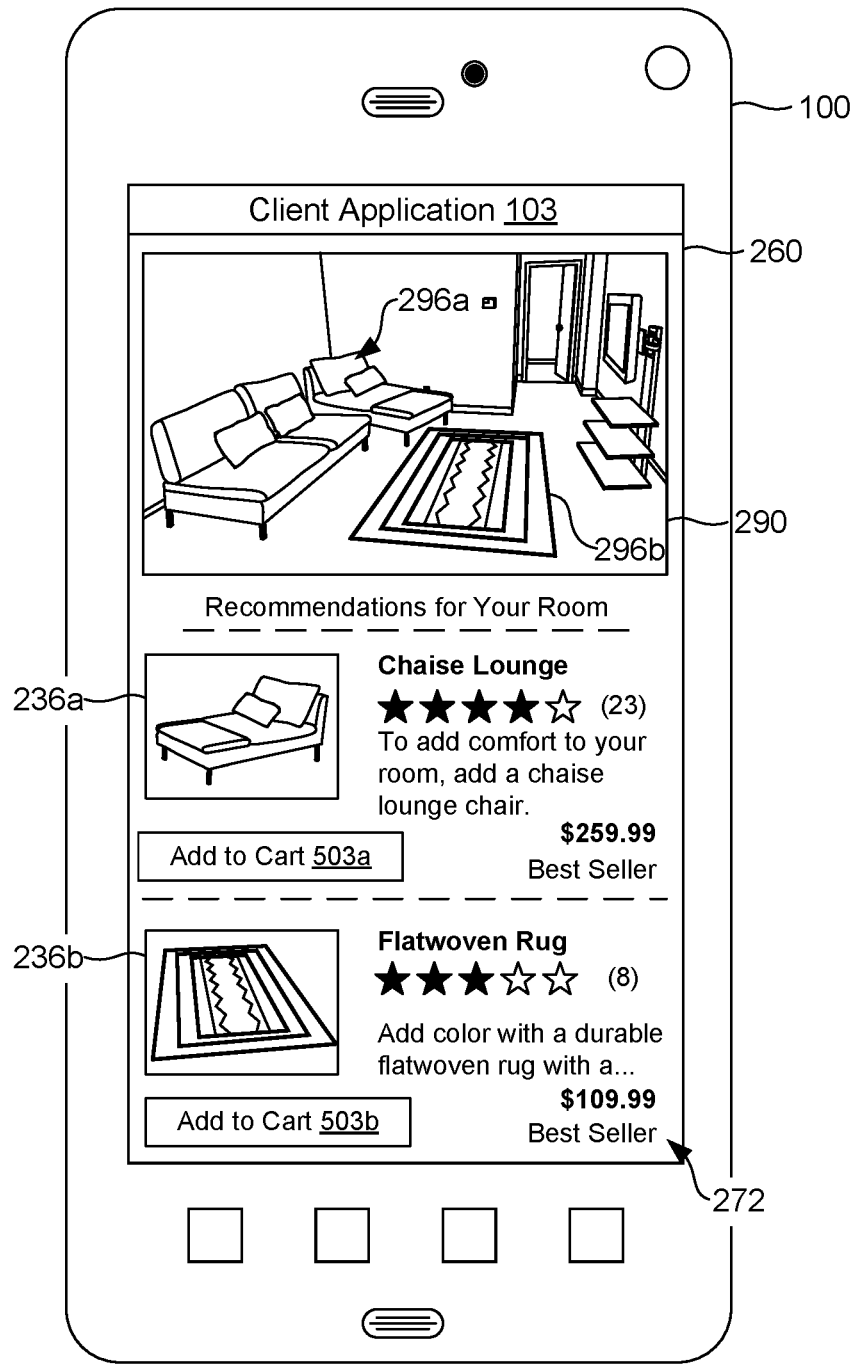
FIG. 5B is a pictorial diagram of another example user interface rendered by the client device in the networked environment of FIG. 2 according to various embodiments of the present disclosure.

Turning now to FIG. 5B, shown is yet another example user interface 272 rendered by the client device 100 in the networked environment of FIG. 2 according to various embodiments of the present disclosure. In the non-limiting example of FIG. 5B, the client device 100 may comprise a mobile computing device, a tablet computing device, or a similar computing device capable of executing the client application 103 (FIG. 1) to render the user interface 272 in the display 260. As may be appreciated, the client device 100 shown in FIG. 5B may be the same or different device that initially captured the digital image 106. As shown in FIG. 5B, the user interface 272 comprises the modified form of the digital image 290 depicting the recommended items 296 placed in the empty regions 406 (FIG. 4A).

As discussed above, the recommended items 296 may be shown in another portion of the user interface 272 in the client application 103 that facilitates placement of one or more of the recommended items 296 in a virtual shopping cart of the electronic commerce system 212 (FIG. 2). As a non-limiting example, a list of the recommended items 296 may be shown in association with the modified form of the digital image 290. The list of the recommended items 296 may comprise a name, a description, a price, an average review, the representative images 236a . . . 236b, and/or other information associated with the recommended item 296. As may be appreciated, a first add to cart component 503a and a second add to cart component 503b (collectively add to cart components 503) may facilitate placement of the first recommended item 296a and the second recommended item 296b, respectively, in the virtual shopping cart upon a manipulation by the user.

Figure 6:
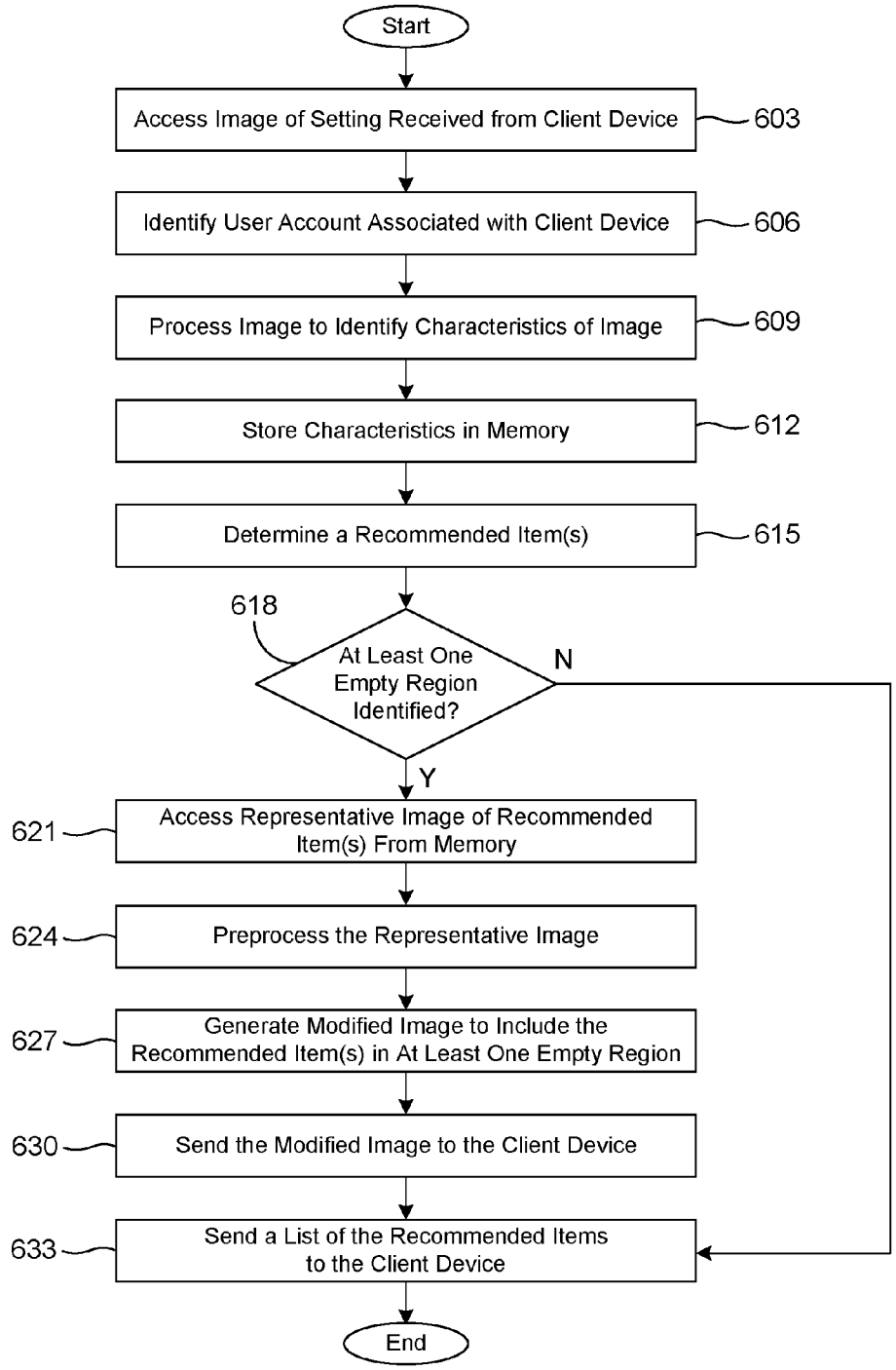
FIG. 6 is a flowchart illustrating one example of functionality implemented as portions of an image analysis engine, a recommendation service, and an image modification engine executed in a computing environment in the networked environment of FIG. 2 according to various embodiments of the present disclosure.

Referring next to FIG. 6, shown is a flowchart that provides one example of the operation of a portion of the image analysis engine 215, the recommendation service 218, and/or the image modification engine 221 according to various embodiments. It is understood that the flowchart of FIG. 6 provides merely an example of the many different types of functional arrangements that may be employed to implement the operation of the portion of the image analysis engine 215, the recommendation service 218, and the image modification engine 221 as described herein. As an alternative, the flowchart of FIG. 6 may be viewed as depicting an example of elements of a method implemented in the computing environment 203 (FIG. 2) according to one or more embodiments.

Beginning with 603, the image analysis engine 215 accesses the digital image 106 (FIG. 1) from the client device 100 or from the data store 209 (FIG. 2) to identify various characteristics about the room or setting embodied in the digital image 106. As may be appreciated, the user may capture the digital image 106 of the setting via the image capturing device 266 (FIG. 2), such as a front-facing digital camera or a rear-facing digital camera within or in communication with the client device 100 (FIG. 1). In alternative embodiments, the digital image 106 may be obtained via an external device, such as a digital camera, and provided to the computing environment 203, as may be appreciated. Upon receipt of the digital image 106 by the computing environment 203, the digital image 106 may be stored in data store 209 for subsequent access by the image analysis engine 215 (FIG. 2) and/or other services or applications described herein.

Moving on to 606, the user account 233 (FIG. 2) associated with the user of the client application 103 and/or the electronic commerce system 215 (FIG. 2) is identified. Identification of the user may be performed by requiring the user to authenticate his or her credentials prior to accessing various features of the client application 103. By identifying the user account 233 associated with the client device 100, historical data 239 may be collected and utilized in recommending one or more items to the user, as will be described below.

In 609, the image analysis engine 215 accesses the digital image 106 to identify various characteristics about the setting embodied in the digital image 106. The characteristics capable of being detected by various image processing methodologies include colors of objects 403 (FIG. 4A) identifiable in the setting; the lighting; the type, identity, size, shape, and arrangement of the objects 403 in the setting; empty regions 406 (FIG. 4A) in the setting; and/or other characteristics. In 612, the characteristics identified in the digital image 106 may be stored in association with the user in the data store 209 and may be used in future recommendations, as may be appreciated.

Next, in 615, the image analysis engine 215 may communicate the identified characteristics to the recommendation service 218 (FIG. 2) to identify one or more items in the item catalog 230 that may be recommended to the user. According to various embodiments, the items recommended to the user may be determined utilizing at least historical data 239 (e.g., browse history data, purchase history data, or other data) (FIG. 2) associated with the user account 233 as well as the characteristics identified in the digital image 106 of the setting. For example, the items recommended to the user may be determined based at least in part on the colors identified in the room; the lighting; the type, size, shape, and arrangement of the objects in the room; the empty regions 406; and/or other characteristics. The recommended item is identified from items offered for consumption via the electronic commerce system 212.

In another example, collaborative filtering may be applied to filter the historical data 239 associated with a plurality of user accounts 233 to identify patterns, such as purchase or item consumption patterns, associated with the user accounts 233. To this end, interests of a specific user may be estimated by collecting preferences or taste information from similar users. In addition, the recommendation service 218 may employ various design patterns stored in the data store 212 to identify items to recommend to the user. Design patterns may comprise, for example, predefined constraints that limit a number of items to be recommended to the user. For example, if a user has a brown floor in the setting, the recommendation service 218 may determine from the design patterns that a sofa with a substantially brown color should not be recommended to the user.

According to various embodiments, the recommendation service 218 may employ a ranking of the items in the item catalog 230 to identify a subset of the most relevant items to recommend to the user. For example, the items may be ranked according to a score calculated for each of the items as follows:

$$\text{Score}=C_1f_1+C_2f_2+C_3f_3+\ldots+C_Nf_N \qquad (\text{eq. 1}).$$

As set forth above, each factor f is weighted by a constant C that may be assigned in the recommendation service 218 based on, for example, experience of a system administrator, to indicate the relative importance of each factor f in considering the score for a given item in the item catalog 230. Each of the factors f may comprise, for example, a relatedness (or affinity) of an item relative to the historical data 239 associated with the user, a relatedness of an item relative to the characteristics identified in the setting embodied in the digital image 106, etc. Further, the factors may include a relatedness or affinity of an item relative to the characteristics detected in the setting including the colors of the objects in the setting; the lighting; the type, identity, size, shape, and arrangement of the objects in the room; empty regions in the setting; a combination thereof; and/or other characteristics.

In 618, it is determined whether at least one empty region 406 was identified by the image analysis engine 212 in the digital image 106. If the at least one empty region 406 is not identified in the digital image 106, the process proceeds to 633 to send the list of the recommended items 296 to the client device 100, as will be discussed in greater detail below. As may be appreciated, the recommended items may be provided to the user based on the digital image 106 regardless of whether a representative image of the recommended item may be inserted in the digital image 106. However, if at least one empty region 406 is identified in the digital image 106, in 621, the representative image 236 of one or more recommended items 296 are accessed from memory.

As discussed above, the image modification engine 221 may be leveraged such that the recommended item 296 may be inserted into at least one of the empty regions 406 identified in the digital image 106. The image modification engine 221 may utilize existing representative images 236 of the recommended item accessed, for example, from the data store 209 for insertion into the at least one of the empty regions 406 in the digital image 106 by the image modification engine 221 to generate the modified form of the digital image 290 (FIG. 2). Insertion may comprise taking all or a portion of the representative image 236 and inserting the all or a portion of the representative image 236 into the digital image 106 such that the recommended item 296 appears in the digital image 106 provided by the user.

As may be appreciated, the recommended item 296 may comprise more than one representative image stored in the item catalog 230, such as the various images shown in the product page corresponding to the item in the electronic commerce system 212. Accordingly, the item modification engine 221 may find a best match utilizing the various characteristics of the digital image 206 identified via the image analysis engine 215.

In 624, the image modification engine 221 may preprocess the representative image 236 of the recommended item prior to insertion into the empty region of the digital image 106. Preprocessing may include applying a filter to the representative image and/or removing portions of the representative image 236 that may be unneeded based on the characteristics of the digital image 106 (e.g., a background or portions of the item).

As a non-limiting example, a representative image 236 of a chaise lounge chair may be preprocessed such that a color of the chair is changed and the size of the chair is scaled to be consistent with the scale of the setting embodied in the digital image 106. In another example, the background of the representative image 236 of the chair may be removed such that the chair may be applied in the setting of the digital image 106. In yet another example, a portion of the representative image 236 of the sofa may be removed or modified such that foreground objects in the digital image 106 may appear to be in front of the sofa.

In 627, the image modification engine 221 generates a modified form of the digital image 290 comprising at least the recommended item 296 in the at least one of the empty regions 406 identified in the setting. The modified form of the digital image 290 may comprise a new digital image file in various image formats (e.g., JPEG, GIF, PNG, BMP, TIFF) or may comprise a modified version of the same digital image 106 provided by the user. According to various embodiments, the image modification engine 221 may generate a three-dimensional reconstruction of the setting comprising at least the recommended item. For example, given the user of the client device 100 has provided a plurality of digital images 106 of the setting (or a video of the setting), the image modification engine 221 may stitch the digital images 106 provided to generate a three-dimensional model of the setting that may be encoded for rendering in the user interface 272. Further, construction of the three-dimensional model may employ motion estimation, homography, various camera models, etc.

Subsequently, in 630, the computing environment 203 may transmit the modified form of the digital image 290 to the client device 100 for rendering in the display 260 (FIG. 2). In 633, a list of the recommended items 296 may be sent to the client device 100 for rendering. As may be appreciated, 630 and 633 may be performed concurrently by sending the modified form of the digital image 290 and the list of the recommended items 296 to the client device 106 simultaneously.

According to various embodiments, the modified form of the digital image 290 may be encoded for rendering by the computing environment 203 prior to transmission or by the client device 100 after transmission. According to various embodiments, a dynamic region may be encoded on or over the recommended item 296 of the digital image 106 such that, when manipulated by the user, additional information associated with the recommended item may be shown to the user, as shown above in the non-limiting example of FIG. 4B. As a non-limiting example, a dialog 412 (FIG. 4B) may be generated by the client application 103 and rendered in the display 260.

The modified form of the digital image 290 may be transmitted via the web service 224 as a portion of recommendation data 293 that may comprise an encoded network page that may be rendered via a web browsing application. In alternative embodiments, the recommendation data 293 may be used in generating a user interface 272 in the client application 103 (e.g., a mobile application executable by a mobile device operating system).

According to various embodiments, the flowchart of FIG. 6 may be implemented in a robotic computing device, such as an autonomous or semi-autonomous robotic device capable of moving about a setting. For example, an imaging device, within or in communication with the robotic device, may capture the digital image 106 to identify the characteristics of the setting in which the robotic device moves. The empty regions 406 identified in the setting may be used for movement of the robotic device (e.g., moving to an empty region 406 without collision) and/or determining a placement of items in the empty regions 406. Instead of accessing a catalog of items associated with the electronic commerce system 212 from the data store 212, the robotic device may maintain a list of items in memory. Using the list of items, the robotic device may determine and/or conduct the placement of the items in the empty regions 406.

Figure 7:
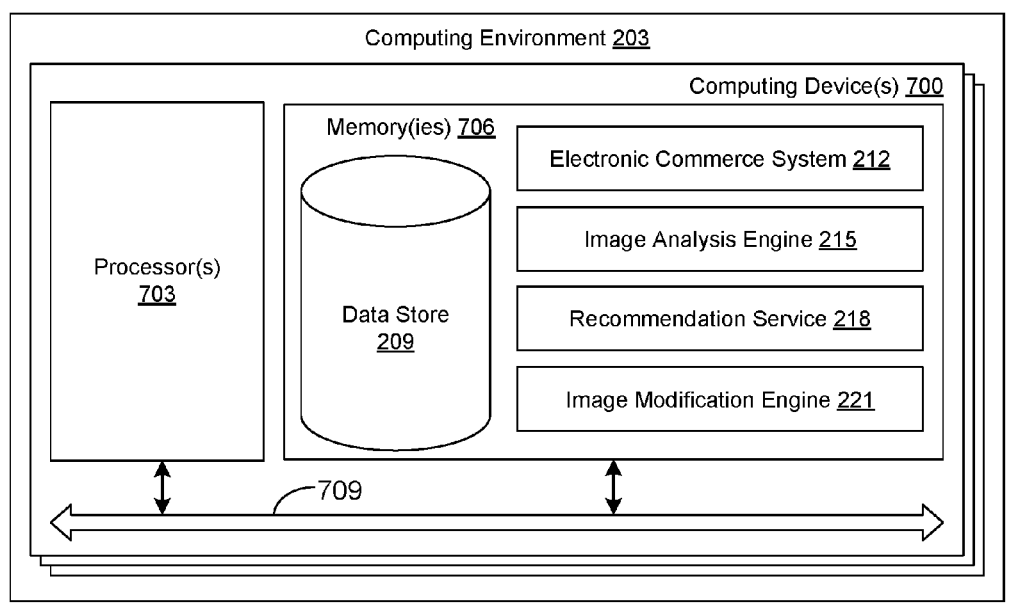
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the electronic commerce system 212, the image analysis engine 215, the recommendation service 218, the image modification engine 221, the web service 224, and potentially other applications. Also stored in the memory 706 may be a data store 209 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the electronic commerce system 212, the image analysis engine 215, the recommendation service 218, the image modification engine 221, the web service 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 6 shows the functionality and operation of an implementation of portions of the electronic commerce system 212, the image analysis engine 215, the recommendation service 218, the image modification engine 221, and/or the web service 224. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 212, the image analysis engine 215, the recommendation service 218, the image modification engine 221, and/or the web service 224, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce system 212, the image analysis engine 215, the recommendation service 218, the image modification engine 221, and/or the web service 224, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    at least one computing device;
    program instructions executable in the at least one computing device that, when executed by the at least one computing device, cause the at least one computing device to:
        analyze a digital image captured by a digital camera of a client device to:
            identify a plurality of objects in a setting embodied in the digital image;
            identify a plurality of colors associated with the plurality of objects identified in the setting; and
            identify a plurality of empty regions in the setting, the plurality of empty regions being identified as a region in the setting in which no object is recognized;
        identify a recommended item for insertion into one of the plurality of empty regions, the recommended item identified from a plurality of items available offered through an electronic commerce system using at least one of: historical data associated with a user account associated with the client device, one of the plurality of colors identified, one of the plurality of objects identified, and one of the plurality of empty regions identified;
        identify one of a plurality of representative images of the recommended item for insertion into at least one of the plurality of empty regions based at least in part on a ranking of the plurality of representative images, the ranking generated using a score determined for individual ones of the plurality of representative images;
        insert the one of the plurality of representative images of the recommended item having a highest ranking in the at least one of the plurality of empty regions of the digital image such that the recommended item appears naturally in the setting; and
        send the digital image to the client device for display.

2. The system of claim 1, further comprising program code that, when executed, causes the at least one computing device to preprocess the one of the plurality of representative images of the recommended item having the highest ranking prior to inserting the one of the plurality of representative images of the recommended item into the at least one of the plurality of empty regions.

3. The system of claim 2, wherein preprocessing the one of the plurality of representative images of the recommended item comprises at least one of: scaling the one of the plurality of representative images, skewing the one of the plurality of representative images, rotating the one of the plurality of representative images, removing a background of the one of the plurality of representative images, removing a portion of the one of the plurality of representative images, and adjusting a color of the recommended item embodied the one of the plurality of representative images.

4. A non-transitory computer-readable medium embodying program code executable in at least one computing device that, when executed by the at least one computing device, causes the at least one computing device to:
    analyze a setting embodied in a digital image;
    identify an empty region in the setting, the empty region identified as a region in the setting in which no object is recognized;
    identify a recommended item for inclusion in the empty region of the setting, the recommended item identified from data store comprising information for a plurality of items;
    identify a representative image of the recommended item for insertion into the empty region based at least in part on a ranking of a plurality of representative images of the recommended item, the ranking generated using a score determined for individual ones of the plurality of representative images; and
    modify the digital image to have the representative image of the recommended item with a highest ranking appear in the empty region in the setting such that the recommended item appears naturally in the setting.

5. The non-transitory computer-readable medium of claim 4, wherein the score is determined for the individual ones of the plurality of representative images based at least in part on a plurality of characteristics of the setting identified in the digital image.

6. The non-transitory computer-readable medium of claim 5, wherein the score is determined for the individual ones of the plurality of representative images based at least in part on a predefined weight associated with individual ones of the plurality of characteristics.

7. The non-transitory computer-readable medium of claim 6, wherein at least one of the plurality of characteristics comprises: an object identified in the setting, a type of the object identified in the setting, a size of the object identified in the setting, a shape of the object identified in the setting, and a color of the object identified in the setting.

8. The non-transitory computer-readable medium of claim 6, wherein at least one of the plurality of characteristics comprises: an arrangement of a plurality of objects in the setting.

9. The non-transitory computer-readable medium of claim 4, wherein the recommended item is identified based at least in part on historical data associated with a user account, the digital image being transmitted to the at least one computing device by a client device associated with the user account.

10. The non-transitory computer-readable medium of claim 4, wherein the recommended item is identified based at least in part on a collaborative filtering applied to a plurality of different user accounts.

11. The non-transitory computer-readable medium of claim 4, further comprising program code that, when executed, causes the at least one computing device to preprocess the representative image of the recommended item having the highest ranking prior to inserting the one of the plurality of representative images of the recommended item into the empty region.

12. The non-transitory computer-readable medium of claim 11, wherein preprocessing the one of the plurality of representative images of the recommended item comprises at least one of: scaling the one of the plurality of representative images, skewing the one of the plurality of representative images, rotating the one of the plurality of representative images, removing a background of the one of the plurality of representative images, removing a portion of the one of the plurality of representative images, and adjusting a color of the recommended item embodied the one of the plurality of representative images.

13. The non-transitory computer-readable medium of claim 4, further comprising program instructions that, when executed, cause the at least one computing device to generate a dynamic region in a user interface that comprises the digital image such that, when manipulated by a user via a client device, additional information associated with the recommended item is shown in a display.

14. The non-transitory computer-readable medium of claim 4, wherein the digital image is captured by a digital camera within a client device.

15. A method, comprising:
analyzing, by at least one computing device, a plurality of pixels of a digital image to identify an empty region in a setting, the empty region identified as a region in the setting in which no object is recognized;
identifying, by the at least one computing device, a recommended item for insertion into the digital image by inserting a representative image of the recommended item into the empty region in the setting, the recommended item identified from data store comprising information pertaining to a plurality of items;
identifying, by the at least one computing device, a representative image of the recommended item for insertion into the empty region based at least in part on a ranking of a plurality of representative images of the recommended item, the ranking generated using a score determined for individual ones of the plurality of representative images; and
modifying, by the at least one computing device, the digital image to have the representative image of the recommended item with a highest ranking appear in the empty region in the setting such that the recommended item appears naturally in the setting.

16. The method of claim 15, further comprising preprocessing, by the at least one computing device, the representative image of the recommended item.

17. The method of claim 16, wherein the preprocessing the representative image comprises at least one of: scaling the representative image, rotating the representative image, removing a background of the representative image, adjusting a color of the recommended item in ideal the representative image, and removing a portion of the representative image.

18. The method of claim 15, wherein the recommended item is identified utilizing at least one of: historical data associated with a user account, a collaborative filtering applied to a plurality of different user accounts, and a plurality of characteristics of the setting embodied in the digital image, wherein the user account is associated with a user of a client device.

19. The method of claim 18, wherein the plurality of characteristics comprise at least one of: an object in the setting, a type of the object in the setting, a color of the object in the setting, a lighting of the setting, a size of the object in the setting, a shape of the object in the setting, and a location of the object in the setting.

20. The method of claim 15, further comprising encoding, by the at least one computing device, a dynamic region in a user interface that comprises the digital image such that, when manipulated by a user a client device, information associated with the recommended item is shown in a display.

* * * * *